United States Patent Office 3,642,710
Patented Feb. 15, 1972

3,642,710
MANUFACTURE OF POLYDODECAMETHYLENE TEREPHTHALAMIDE
William Ernest Keen and David Kirkaldy, Pontypool, England, assignors to Imperial Chemical Industries Limited, London, England
No Drawing. Filed Nov. 1, 1968, Ser. No. 772,795
Claims priority, application Great Britain, Nov. 13, 1967, 51,537/67
Int. Cl. C08g 20/20
U.S. Cl. 260—78 R
5 Claims

ABSTRACT OF THE DISCLOSURE

A process for the manufacture of polydodecamethylene terephthalamide wherein dodecamethylene diammonium terephthalate is heated in the presence of a lower fatty acid viscosity stabilizer at a temperature of about 255 to 275° so that the reaction mass remains solid. The polyamide thus produced can be melt-spun into filaments.

---

This invention relates to improvements in the manufacture of polyamides and more particularly to the manufacture of high molecular weight synthetic polydodecamethylene terephthalamide capable of being melt-spun.

The relatively high initial modulus of yarn consisting of polydodecamethylene terephthalamide filaments, makes it especially useful for tyre cord and also for weaving, since the yarn is less sensitive to variations in tension during fabrication of the fabric. When, however, polydodecamethylene terephthalamide is made by conventional processes of polymerisation carried out in the molten condition, the high temperature required, say 300° C., causes degradation of the polymer. As a result of this the filaments obtained possess inferior properties. It has now been found that these disadvantages can be overcome by carrying out the polymerisation at lower temperatures so that the reacting mass and polyterephthalamide formed remain solid. The temperature must, however, be sufficiently high to ensure a useful rate of reaction. Experiments demonstrate that the range 260°-270° C. is appropriate. In order to obtain a polydodecamethylene terephthalamide capable of being successfully melt-spun into filaments under commercial conditions it is, moreover, essential to employ a viscosity stabiliser, in other words, a reagent capable of controlling the molecular weight attained when the polymerisation reaction arrives at equilibrium. For this purpose the lower fatty acids are suitable.

The manufacture of polydodecamethylene terephthalamide by the polycondensation of dodecamethylene diamine and terephthalic acid has been described in Belgian patent specification No. 657,348. There however, the condition in which the polydodecamethylene terephthalate reaches polymerisation equilibrium realised kinetically, is not solid but molten. British patent specification No. 1,012,553 discloses a process for the production of polyamides from dicarboxylic acids and diamines, e.g. polyhexamethylene adipamide from hexamethylene diamine and adipic acid, by polycondensation of the monomers in solid phase. There is, however, no reference to polydodecamethylene terephthalamide although it is said that terephthalic acid and other diamines e.g. tetramethylene diamine, may be used. Nor are any viscosity stabilisers mentioned. On the other hand, as already stated, their use is indispensable in applicant's process.

The temperature at which the reaction process of the present invention is carried out must not be too low or the reaction is inordinately slow and tends to give an undesirable product containing too wide a range of molecular weight for melt spinning. Of course, such a product may be further heated in the molten state to complete polymerisation and reduce the content of low molecular weight material, but such further heating in the molten state brings with it the danger of degradation. Again, degradation rapidly increases with increasing temperature. From these considerations it will readily be seen that the feasible practical temperature range for carrying out the process of the present invention is quite narrow and in fact, lies within the limits 255° C. to 275° C. Preferably the temperature should lie between 260° C. and 270° C. and the optimum temperature range is 268° C. to 272° C.

Accordingly the invention relates to a process for the manufacture of polydodecamethylene terephthalamide comprising effecting the polycondensation of dodecamethylene diammonium terephthalate by heating it in the presence of a lower fatty acid viscosity stabiliser at from 255° C. to 275° C. and preferably from 260° C. to 270° C. so that the reaction mass remains solid.

The lower fatty acid stabiliser must be volatile under polymerisation conditions and preferably have a carbon number of two, three or four.

It should be added in an amount of between 1 and 4 molar percent on the polymer and preferably between 2 and 3 molar percent.

Instead of the dodecamethylene diammonium terephthalate salt there may be used as starting material a substantially equimolecular mixture of dodecamethylene diamine and terephthalic acid or functional derivatives thereof which condense to form the polyamide.

The resulting polydodecamethylene terephthalamide is readily melt-spinnable into yarn having excellent properties and the invention includes films, filaments and yarns so obtained.

Examples of the acid viscosity stabilisers are: acetic acid; propionic acid; butyric acid.

If desired plasticsers e.g. p-tert butylphenol, may be incorporated but they are not essential. Other adjuvants may also be added at any convenient stage of the process, if desired, for instance: dyes, pigments, dyestuff formers, heat stabilisers, light stabilisers, delustrants, polyamide and other resins.

Inherent viscosity

The phrase "Inherent Viscosity" employed below signifies twice the natural logarithm of the quotient of the viscosity at 25° C. of a solution of ½% weight by volume of the terephthalamide dissolved in dichloroacetic acid, divided by the viscosity of dichloroacetic acid at 25° C.

Initial modulus

The Initial Modulus is defined as the load in grams per denier which produces 1% extension multiplied by 100.

In the following examples which are for the purpose of illustrating, not limiting, the invention, the parts are parts by weight.

EXAMPLE 1

169 parts of dodecamethylene diammonium terephthalate and 2.8 parts of a 0.2% solution of acetic acid in water (2 mole percent) are placed in a 1 litre stainless steel autoclave fitted wih a stainless steel helical stirrer. The vessel is purged with nitrogen and then sealed. The terephthalate salt and acetic acid solution are stirred and the temperature rises to 270° C. during 100 minutes, and the pressure to 6²/3 atmospheres. The mixture is stirred at 270° C. for a further 120 minutes when the pressure rises to 13¹/3 atmospheres. The pressure is then lowered to atmospheric pressure during 20 minutes and the material stirred for a further period of 60 minutes at 270° C.

The polymer is rod-spun at 325° into a yarn of 5 filaments, which is drawn to 5.25 times its original length over a hot plate at 200° C. The filaments have the following properties:

Inherent viscosity—0.79
Tenacity—7.0 gms. per denier
Extensibility at break—9.0%
Initial modulus—65

EXAMPLE 2

Example 1 is repeated except that the rod-spinning is carried out at 335° C. and the yarn drawn to 4 times its original length. The filaments possess the following properties:

Inherent viscosity—1.00
Tenacity—4.7 gms. per denier
Extensibility at break—9.8%
Initial modulus—45

EXAMPLE 3

300 parts of dodecamethylene diammonium terephthalate and 4.9 parts of a 0.2% solution of acetic acid (2 moles) are placed in a 1 litre stainless steel vessel fitted with a stainless steel helical stirrer. The vessel is purged with nitrogen, sealed, but kept at atmospheric pressure by an open pipe connection to a water trap.

The terephthalate salt and acetic acid solution are stirred and the temperature rises to 270° C. during 90 minutes, the pressure remaining at atmospheric. The mixture is stirred at 270° C. and at atmospheric pressure for a further 250 minutes.

The polymer is rod spun at 320° C. into a yarn of 5 filaments which is drawn to 4.75 times its original length over a hot plate at 160° C.

The filaments have the following properties:

Inherent viscosity—Not determined
Tenacity—7.4 gms. per denier
Extensibility at break—9.8%
Initial modulus—60

EXAMPLE 4

300 parts of dodecamethylene diammonium terephthalate and 9.8 parts of a 0.2% solution of acetic acid in water (4 mole percent) are placed in a 1 litre stainless steel autoclave fitted with a stainless steel helical stirrer. The vessel is purged with nitrogen and then sealed. The terephthalate salt and acetic acid solution are stirred and the temperature rises to 270° C. during 75 minutes and the pressure to $4^{2/3}$ atmospheres. The mixtures is stirred at 270° C. for a further period of 105 minutes, the heating is then discontinued and the material is allowed to cool to atmospheric conditions.

The polymer obtained could be extruded but gave brittle filaments.

EXAMPLE 5

250 parts of dodecamethylene diammonium terphthalate and 12.5 parts of a 0.27% solution of acetic acid in water (6 mole percent) are placed in a 1 litre stainless steel autoclave fitted with a stainless steel helical stirrer. The vessel is purged with nitrogen and then sealed. The terephthalate salt and acetic acid solution are stirred and the temperature rises to 270° C., the pressure to $8^{1/3}$ atmospheres, during 135 minutes.

The mixture is stirred at 270° C. for a further 45 minutes, the heating is then discontinued and the material is allowed to cool to atmospheric conditions.

On spinning the polymer obtained, extremely brittle filaments were obtained.

EXAMPLE 6

250 parts of dodecamethylene diammonium terephthalate are placed in a 1 litre stainless steel autoclave fitted with a stainless steel helical stirrer. The vessel is purged with nitrogen and then sealed. The terephthalate salt is stirred and the temperature rises to 250° C. during 75 minutes and the pressure to $3^{1/3}$ atmospheres.

The material is stirred at 250° C. for a further period of 270 minutes when the pressure rises to 12 atmospheres. The heating is discontinued and the material is allowed to cool to atmospheric conditions.

The polymer obtained was very difficult to extrude.

EXAMPLE 7

250 parts of dodecamethylene diammonium terephthalate are place in a 1 litre stainless steel autoclave fitted with a stainless steel helical stirrer. The vessel is purged with nitrogen and then sealed. The terephthalate salt is stirred and the temperature rises to 260° C. during 55 minutes and the pressure to 5 atmospheres. The material is stirred at 260° C. for a further period of 245 minutes when the pressure rises to $16^{2/3}$ atmospheres. The heating is discontinued and the material is allowed to cool to atmospheric conditions.

It was not possible to extrude this polymer.

EXAMPLE 8

300 parts of dodecamethylene diammonium terephthalate and 6.1 parts of a 0.2% solution of acetic acid (2½ mol percent) are placed in a 1 litre stainless steel vessel fitted with a stainless steel helical stirrer. The vessel is purged with nitrogen, sealed, but kept at atmospheric pressure by an open pipe connection to a water trap.

The terephthalate salt and acetic acid solution are stirred and the temperature rises to 260° C. during 90 minutes, the pressure remaining at atmospheric. The mixture is stirred at 260° C. and at atmospheric pressure for a further 240 minutes. The I.V. of the polymer is 0.98.

The polymer is rod spun at 337° C. into a yarn of 5 filaments which is drawn to 4 times its original length.

The filaments have the following properties:

Tenacity _____ 4.3
Initial modulus _____ 38.2
Extensibility at break _____ 18.3

EXAMPLE 9

300 parts of dodecamethylene diammonium terephthalate and 1.9 parts of propionic acid (3 mol percent) are placed in a 1 litre stainless steel vessel fitted with a stainless steel helical stirrer. The vessel is purged with nitrogen, sealed, but kept at atmospheric pressure by an open pipe connection to a water trap.

The terephthalate salt and acetic acid solution are stirred, and the temperature rises to 260° C. during 90 minutes, the pressure remaining at atmospheric. The mixture is stirred at 260° C. and at atmospheric pressure for a further 240 minutes. The I.V. of the polymer is 0.9.

The polymer is rod spun at 320° C. into a yarn of 5 filaments which is drawn to 3.75 times its original length.

The filaments have the following properties:

Tenacity _____ 3.9
Extensibility at break _____ 22.8
Initial modulus _____ 38

What we claim is:
1. In a process for the manufacture of high molecular weight, film-forming polydodecamethylene terephthalamide by heating dodecamethylene diammonium terephthalate so that the latter is polycondensed to give said high molecular weight, film-forming polydodecamethylene terephthalamide, the improvement wherein said dodecamethylene diammonium terephthalate is heated in the presence of about 1 to 4 mole percent of a lower fatty acid viscosity stabilizer, calculated on the amount of polydodecamethylene terephthalamide produced, at from 255° C. to 275° C. so that the reaction mass remains solid throughout said process.

2. A process as claimed in claim 1 wherein said heating takes place at 268° C. to 272° C.

3. A process according to claim 1 wherein said stabilizer has two to four carbon atoms.

4. A process according to claim 1 wherein said stabilizer is present in an amount of between 2 and 3 percent on the polymer.

5. A process as claimed in claim 1 wherein said heating takes place at 260° to 270° C.

References Cited

UNITED STATES PATENTS

| | | | |
|---|---|---|---|
| 2,752,328 | 6/1956 | Magat | 260—78 |
| 3,232,909 | 2/1966 | Werner | 260—78 |
| 3,379,696 | 4/1968 | Wiloth | 260—78 |
| 3,471,452 | 10/1969 | Haworth et al. | 260—78 |
| 3,475,387 | 10/1969 | Carter et al. | 260—78 |

HAROLD D. ANDERSON, Primary Examiner

U.S. Cl. X.R.

57—140 R